Sept. 9, 1969  G. W. SEIFERT  3,465,861
THERMOSTATIC CLUTCHES FOR FANS

Filed April 4, 1968  2 Sheets-Sheet 1

Inventor:
Gerd W. Seifert
By Jacobi & Davidson
  Attorneys

Inventor:
Gerd W. Seifert
By Jacobi & Jacobi
Attorneys

United States Patent Office 3,465,861
Patented Sept. 9, 1969

3,465,861
THERMOSTATIC CLUTCHES FOR FANS
Gerd W. Seifert, Seestrasse 190, Unterschondorf
(Ammersee), Germany
Filed Apr. 4, 1968, Ser. No. 718,684
Claims priority, application Germany, Apr. 5, 1967,
S 109,210
Int. Cl. F16d *19/00, 43/25*
U.S. Cl. 192—82                                     6 Claims

ABSTRACT OF THE DISCLOSURE

The specification describes improvements in thermally triggered friction clutches for IC engine cooling fans of the type in which clutch plates are initially brought into contact by a bimetallic element and are then pressed together by means of relative turning between screw parts. In accordance with a principal improvement access to the rear of such a construction is arranged to be obtained through at least one hole in the bimetallic element which is or can be brought into alignment with at least one hole in a hub carrying the fan blades or impellor.

---

The present invention relates to improvements in cooling air blowers or fans for IC engines of the type comprising a bimetallic element which responds to the cooling air temperature and controls screw drive means with a large helix angle which serves to press the clutch plates of a clutch into engagement with one another. One of the clutch plates is connected both with the bimetallic element and with an axially moving nut of the screw drive means. The fan blades or impellor—in what follows the the term impellor is used to cover both axially acting propellor—type fan blades and also a purely centrifugal type impellor—is carried on a hub which has approximately axial holes for the passage of bridge pieces to connect the axially moving clutch part with the bimetallic element.

One object of the present invention is to enable these holes to be used for the passage of a tool.

The present invention consists in a cooler fan for an IC engine comprising an impellor hub, first and second clutch parts forming a rotary clutch coaxial with the hub, first and second screw parts arranged to rotate about the same axis of rotation as the clutch, and to produce an axial thrust engaging the clutch when turned in relation to each other, one of the screw parts being arranged to be turned in relation to the other of the screw parts by one of the clutch parts, and a bimetallic heat-responsive element which is exposed to the cooling air and is arranged to press the clutch parts together in response to a change in the temperature of the cooling air so that the screw parts are turned in relation to one another and press the clutch part together, characterised in that the bimetallic element which is approximately parallel to the hub has at least one axis-parallel hole at the same distance from the axis of rotation as axis-parallel holes in the hub for the insertion of a tool in an approximately axis-parallel direction.

In accordance with a preferred feature of the invention the bimetallic element has several such holes which are arranged in it so as to balance each other as regards centrifugal forces during rotation.

The holes in the bimetallic element can be provided with removable closing plugs.

In a preferred form of the invention the bimetallic element and the clutch are arranged on opposite sides of the holes and are connected by at least one bridge piece extending through one of the holes in the hub.

The construction can comprise a tangentially and/or axially acting tension spring between the hub and one clutch part.

Further features of the invention will appear from the following description referring to the accompanying drawing which shows two embodiments of the invention.

Figure 1:
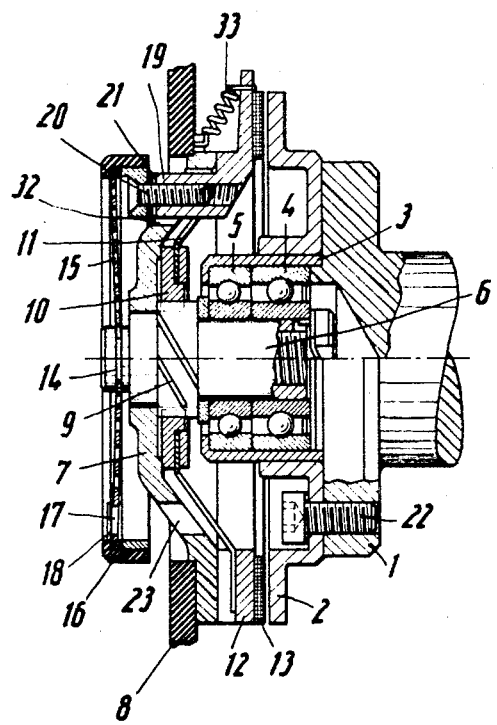
FIGURE 1 shows a fan coupling in accordance with a first embodiment of the invention, partially in axial section.

Referring now to the drawings and more particularly to FIGURE 1, reference numeral 1 denotes a drive flange 1 which is driven by an IC engine and is connected either with a water pump or with a V-groove pulley. Attached to the drive flange 1 there is a friction flange 2 forming a clutch part. This flange 2 is made of pressed sheet steel and is fixed to a sleeve 3. Between the drive flange 1 and the friction flange 2 a pulley, not shown can be provided. In the sleeve 3, which serves as a bearing support, there are ball bearings 4 and 5 which serve for carrying fan shaft 6 which carries an impeller hub 7 carrying the fan impellor 8. The shaft 6 has helical grooves 9 with a large helix angle and on it a nut 10 is fitted so it can rotate. The nut 10 carries a spider spring 11 which is connected with a further friction clutch part 12, carrying a friction pad 13, in such a manner that the two cannot rotate in relation to each other but axial movement of the nut in relation to the clutch part 12 is possible.

At the outer end 14 of the fan shaft 6 there is a disc-shaped control part 15 in the form of a bimetallic element. This control part 15 is mounted in a housing 16 and has holes 17 which can be closed by means of plugs 18 made for instance of rubber. Between the friction pad 12 and the housing 16 there is an axial connection in the form of bridge pieces 19 which are connected with the part 12 in a fixed manner. The hub 7 has holes 32 in the form of arcuate slots through which the bridge pieces 19 extending between the pad 12 and the housing 16 extend. The holes 17 of the control part 15 are at the same distance from the axis of rotation as the holes 32 of the hub and can be aligned axially if the shape of the driving flange 1 makes this possible. Otherwise additional arcuate holes 23 can be provided in the hub which correspond with the holes 17 in the control part or bimetallic element 15. The housing 16 of the bimetallic element 15 is attached to the bridge pieces 19 by means of screws 20, shims 21 being placed between them. For doing up these screws 20 the tool such as a screw-driver is passed through a hole 17, which has been brought into alignment with the hole 23, and afterwards the hole 17 is closed by means of plug 18.

Friction flange or clutch part 2, which carries the bearing means 4 and 5 by means of the sleeve 3 and therefore whole fan housing, is attached to the drive flange 1 by means of screws 22 which can be reached, for example by means of a screw driver, through one of the holes 17, and 23 or 32 between the arms of the spider spring 11. Since the bimetallic element 15 can be rotated in relation to its housing 16, it is not necessary that there should be as many holes 17 in the bimetallic element 15 as there are attachment screws 22 and 20. Preferably the arrangement is such that there are as few holes in the bimetallic element as possible, but the holes should be so distributed as to prevent lack of balance during rotation owing to centrifugal forces.

Between the hub 7 and the clutch part 12 there is an energy storage means in the form of a spring 33 which operates tangentially and/or axially. The tangential force of the spring turns the clutch part 12 and the spider spring 11 with the nut 10 are turned so as to move to the left, as will me made clear below. An axial component of the spring 33 ensures that there is engagement with the flange hub 7 so that the clutch part 12 and the nut 10 with the spider spring 11 are held in the rest position shown in FIGURE 1.

Figure 2:
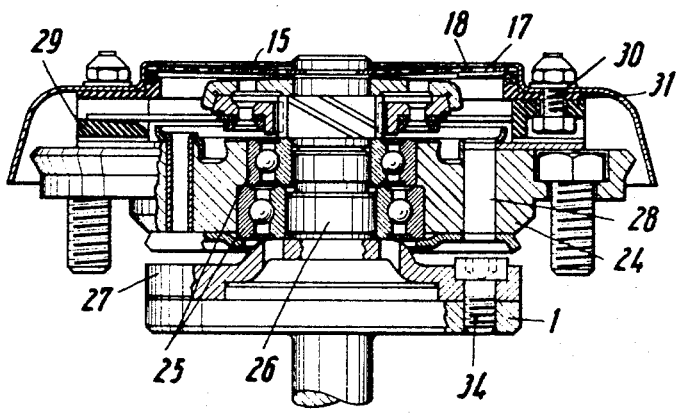
FIGURE 2 shows a fan coupling forming the second embodiment of the invention partially in axial section.
Figure 3:
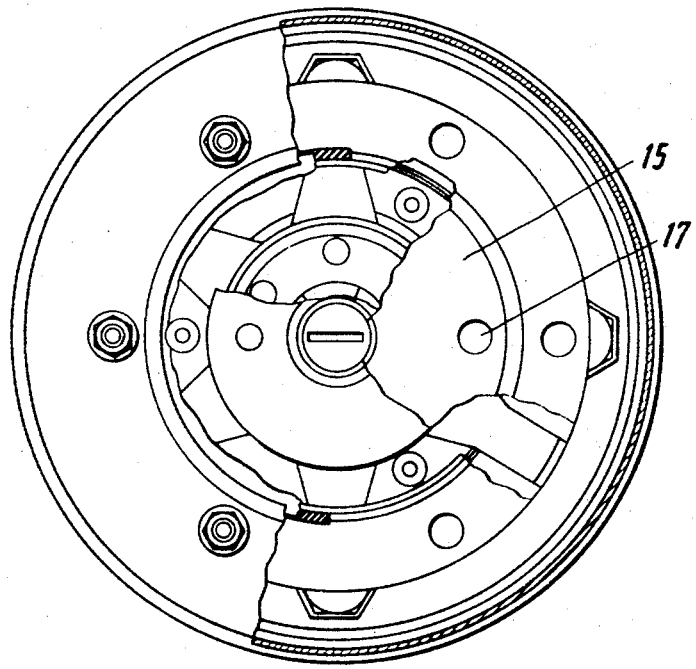
FIGURE 3 is an end-on view and partial section of the clutch in accordance with FIGURE 2.

The construction shown in FIGURES 2 and 3 has a drive flange 1 and fan or impellor hub 24 which is journalled by means of ball bearing 25 on a shaft 26 which ends in a flange 27 which is connected by means of screws 34 with the drive flange 1. The bimetallic element 15 is mounted on the front end of the shaft 26. The bimetallic element has holes 17 which can be closed by means of plugs 18.

The hub 24 has holes 28 which have approximately the same distance from the axis as the holes 17 in the bimetallic element 15 so that the holes 17 and 28 can provide access for a tool for the attachment of the assembly by means of screws 34 on the drive flange 1 of the engine.

The driven clutch part 29 is connected with the housing of the bimetallic element 15 by means of screws 30 and in order to create a pre-tensioning effect shims 31 are used.

The manner of operation of the invention is as follows.

If the temperature of the air flowing axially onto the disc shaped bimetallic element 15 and to the cooler, not shown rises more than a certain amount, the bimetallic element snaps into its other stable, terminal position. As a result the housing 16 is displaced towards the clutch by means of the bridge pieces 19 and presses the friction pad 13 of the clutch part 12 against the friction flange or clutch part 2. The clutch is therefore engaged with a moderate force so that the clutch part 12 and the spider spring connected with the nut 10 are all turned on threads 9 by torque to engage the clutch more tightly. The screw threads 9 engaged by the nut are so constructed that there is a self-reenforcing action on the clutch so that the clutch plates or parts are pressed together with maximum force. The returning force of the spring 33 is easily overcome so that the nut 10 is moved into its working position and in this position the impellor 8 connected by means of the hub 7 is set in rotation. If the air stream cools to a certain degree, the element 15 springs back into its position shown in the drawing. Since the force holding the clutch engagement is, owing to the self-reenforcing action of the nut, substantially greater than the axial force produced by the element 15, the clutch is only disengaged when there is a small torque jerk in the drive of the system comprising the impellor 8, the hub 7 and the shaft 6. Only a very small torque jerk is required, for example as may be caused by oscillations of the IC engine in its suspension. In the case of such a torque jerk the nut 10 is moved back by the tension force of the element 15 so as the latter can move back into its rest position.

What is claimed is:

1. In a cooler fan for an IC engine comprising an impellor hub, first and second clutch parts forming a rotary clutch, coaxial with the hub, first and second screw parts arranged to rotate about the same axis of rotation as the clutch, and to produce an axial thrust for engaging the clutch when turned in relation to each other, one of the screw parts being arranged to be turned in relation to the other screw part by one of the clutch parts, and a bimetallic heat-responsive element which is exposed to cooling air and is arranged to press the clutch parts together in response to a change in the temperature of the cooling air so that the screw parts are turned in relation to each other and press the clutch parts together, the improvement that the bimetallic element, which is approximately parallel to the hub, has at least one axis-parallel hole at the same distance from the axis of rotation as axis-parallel holes in the hub for the insertion of a tool in an approximately axis parallel direction.

2. A cooler fan in accordance with claim 1 in which the bimetallic element has several such holes which are arranged so as to balance each other as regards rotation.

3. A cooler fan in accordance with claim 1 comprising a removable plug for closing the hole in the bimetallic element.

4. A cooler fan in accordance with claim 1 in which the bimetallic element and the clutch are arranged on opposite sides of the hub and are connected by at least one bridge piece extending through one of the holes in the hub.

5. A cooler fan in accordance with claim 1 further comprising a tangentially acting tension spring between the hub and one clutch part.

6. A cooler fan in accordance with claim 1 further comprising an axially acting tension spring between the hub and one clutch part.

References Cited
UNITED STATES PATENTS 3,209,993 10/1965 Seifert.
3,273,681 9/1966 Seifert.

BENJAMIN W. WYCHE III, Primary Examiner

U.S. Cl. X.R.

192—55; 230—271